(12) United States Patent
Schutt

(10) Patent No.: US 11,429,364 B2
(45) Date of Patent: Aug. 30, 2022

(54) SOFTWARE INSTALLATION METHOD

(71) Applicant: Trustonic Limited, Cambridge (GB)

(72) Inventor: Nicholas Schutt, Cambridge (GB)

(73) Assignee: Trustonic Limited, Cambridge (GB)

(*) Notice: Subject to any disclaimer, the term of this patent is extended or adjusted under 35 U.S.C. 154(b) by 0 days.

(21) Appl. No.: 16/683,373

(22) Filed: Nov. 14, 2019

(65) Prior Publication Data

US 2020/0159512 A1 May 21, 2020

(30) Foreign Application Priority Data

Nov. 15, 2018 (GB) ...................... 1818617

(51) Int. Cl.
*G06F 8/61* (2018.01)
*H04L 9/40* (2022.01)

(52) U.S. Cl.
CPC .............. *G06F 8/61* (2013.01); *H04L 63/123* (2013.01)

(58) Field of Classification Search
CPC .................................. G06F 8/61; H04L 63/123
See application file for complete search history.

(56) References Cited

U.S. PATENT DOCUMENTS

| | | | | |
|---|---|---|---|---|
| 8,239,673 B2* | 8/2012 | Shankar | ................ | G06F 21/575 713/193 |
| 8,695,060 B2* | 4/2014 | Wade | ....................... | G06F 8/52 726/1 |
| 8,892,862 B2* | 11/2014 | Nicolson | ............... | H04L 9/3268 713/1 |
| 9,100,172 B2* | 8/2015 | Kim | .................... | H04L 63/0884 |
| 9,276,752 B2* | 3/2016 | Abraham | ............... | G06F 21/565 |
| 10,242,188 B1* | 3/2019 | Easttom | .................. | G06F 21/51 |
| 2004/0177261 A1* | 9/2004 | Watt | .................... | G06F 12/1491 711/E12.1 |
| 2006/0005015 A1* | 1/2006 | Durham | ................ | H04L 9/3236 713/164 |

(Continued)

FOREIGN PATENT DOCUMENTS

| | | |
|---|---|---|
| EP | 2 746 921 | 6/2014 |
| WO | 2016/204913 | 12/2016 |

OTHER PUBLICATIONS

Hatzivasilis et al., "A reasoning system for composition verification and security validation", 2014, IEEE (Year: 2014).*

(Continued)

*Primary Examiner* — Wei Y Zhen
*Assistant Examiner* — Junchun Wu
(74) *Attorney, Agent, or Firm* — Nixon & Vanderhye P.C.

(57) ABSTRACT

A software installation method is provided for a device comprising non-volatile memory 10 and access control circuitry 6 to control access to the non-volatile memory based on region defining data 7 defining whether a given region of the non-volatile memory is a less secure region or a more secure region, with greater access restriction imposed on access to a more secure region than to a less secure region. The method comprises installing target software 40 in a target region of the non-volatile memory 10 defined by the region defining data as a less secure region; verifying the target software; and at least when verification of the target software is successful, and after installation of the target software, updating the region defining data 7 to change the target region from a less secure region to a more secure region.

15 Claims, 5 Drawing Sheets

(56) References Cited

U.S. PATENT DOCUMENTS

| | | | | |
|---|---|---|---|---|
| 2009/0019253 A1* | 1/2009 | Stecher | ............... | G06F 12/1458 |
| | | | | 711/E12.002 |
| 2009/0249075 A1* | 10/2009 | De Atley | ................ | G06F 21/51 |
| | | | | 713/168 |
| 2009/0254993 A1* | 10/2009 | Leone | ................ | H04L 63/1433 |
| | | | | 455/418 |
| 2010/0107249 A1* | 4/2010 | Krig | ........................ | G06F 21/57 |
| | | | | 726/22 |
| 2013/0291061 A1* | 10/2013 | Ikeda | .................... | H04W 4/021 |
| | | | | 726/1 |
| 2015/0089173 A1* | 3/2015 | Chhabra | ............. | G06F 12/1408 |
| | | | | 711/163 |
| 2017/0372058 A1* | 12/2017 | Kulkarni | ................ | G06F 21/78 |
| 2019/0087185 A1* | 3/2019 | Kim | ........................ | G06F 21/64 |
| 2019/0272377 A1* | 9/2019 | Eckardt | ................. | H04W 8/183 |
| 2019/0303541 A1* | 10/2019 | Reddy | ................... | G06F 21/64 |
| 2020/0004952 A1* | 1/2020 | Rolin | .................... | G06F 21/565 |
| 2020/0044865 A1* | 2/2020 | Ward | ..................... | G06F 21/10 |

OTHER PUBLICATIONS

Asokan et al., "ASSURED: Architecture for Secure Software Update of Realistic Embedded Devices", 2018, IEEE, vol. 37, No. 11 (Year: 2018).*

Zeldovich et al., "Hardware Enforcement of Application Security Policies Using Tagged Memory", 2008, USENIX (Year: 2008).*

Williams et al., "Optimal Parameter Selection for Efficient Memory Integrity Verification Using Merkle Hash Trees", 2004, IEEE (Year: 2004).*

Spinellis et al., "Reflection as a Mechanism for Software Integrity Verification", Feb. 2000, ACM, vol. 3, No. 1, pp. 51-62 (Year: 2000).*

Combined Search and Examination Report for GB 1818617.1 dated Apr. 23, 2019, 5 pages.

Microchip, "SAM L11 Security Reference Guide", AN5365, 2018—Microchip Technology Inc., 86 pages.

* cited by examiner

SOFTWARE INSTALLATION METHOD

This application claims priority to GB Patent Application No. 1818617.1 filed Nov. 15, 2018, the entire content of which is hereby incorporated by reference.

The present technique relates to the field of information processing devices. More particularly, it relates to a software installation method for a device comprising non-volatile memory.

A device may have a non-volatile memory for storing software and data which is to be stored persistently even when the device is not powered. Some devices may support partitioning the non-volatile memory into regions with different security levels, e.g. including a less secure region and a more secure region. In general, access to a more secure region may be more restricted than for a less secure region. For example, in some operating states of the device, the device may not be allowed to access the more secure region of the non-volatile memory. This can be useful for protecting sensitive code or data from access by less secure processes executing on the device.

At least some examples provide a software installation method for a device comprising non-volatile memory and access control circuitry to control access to the non-volatile memory based on region defining data defining whether a given region of the non-volatile memory is a less secure region or a more secure region, where the access control circuitry is configured to apply greater restriction on access to a more secure region than to a less secure region; the method comprising: installing target software in a target region of the non-volatile memory defined by the region defining data as a less secure region; verifying the target software; and at least when verification of the target software is successful, and after installation of the target software, updating the region defining data to change the target region from a less secure region to a more secure region.

At least some examples provide at least one computer program to control a device to perform the method described above. At least one storage medium may be provided to store the at least one computer program.

At least some examples provide an apparatus comprising processing circuitry to perform data processing, and data storage storing at least one computer program for controlling the processing circuitry to perform the method described above.

Further aspects, features and advantages of the present technique will be apparent from the following description of examples, which is to be read in conjunction with the accompanying drawings, in which:

FIG. 1 schematically illustrates an example of an information processing device having non-volatile memory;

Figure 1:
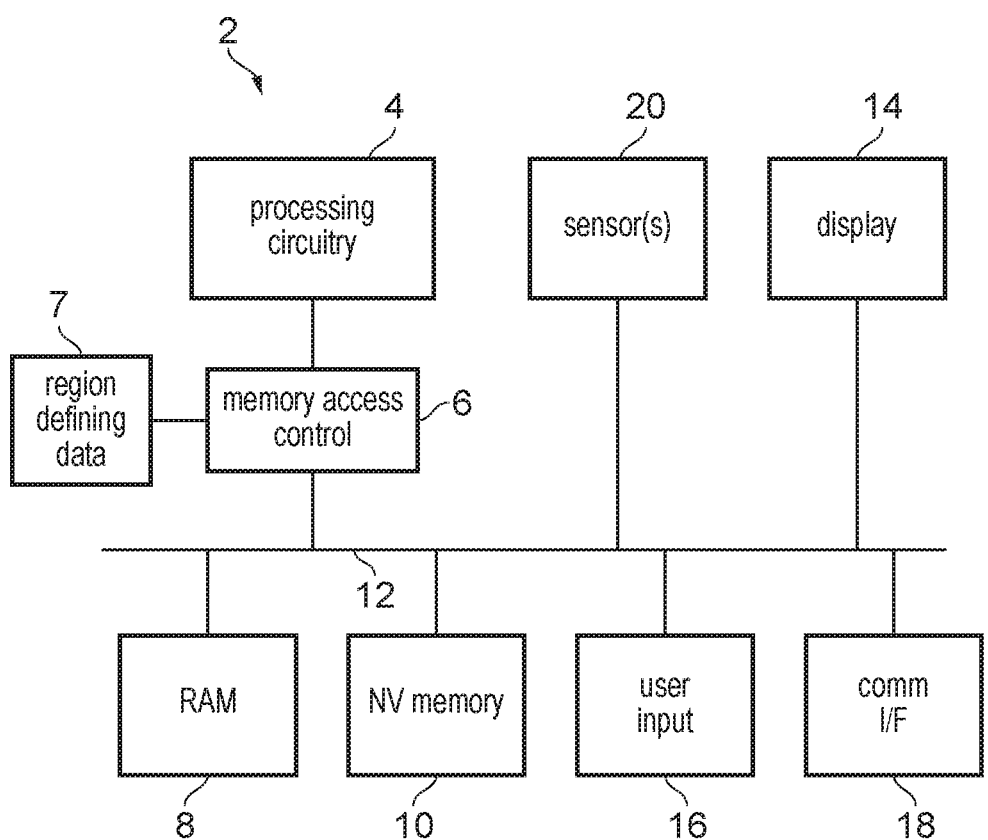

A device may have non-volatile memory and access control circuitry for controlling access to the non-volatile memory based on region defining data which defines whether a given region is a less secure region or a more secure region. By partitioning the non-volatile memory into less secure and more secure regions, greater access restrictions may be imposed on access to the more secure regions than for the less secure regions. However, in such a device it can be challenging to handle installation of secure software to be written to a more secure region of the non-volatile memory.

One approach can be that any secure software which is to be stored in a secure region of the non-volatile memory would need to be written to the non-volatile memory by the original equipment manufacturer (OEM) who manufactured the device, at a point in production when they have full access to the device's memory map. In order to have a root of trust on the device, it may not be allowable for anyone past the initial manufacturer to have full memory access to production devices (including access rights to be able to write to the secure regions of the memory). However, a problem with requiring the OEM to install all the secure software for a device is that this is extremely constraining for the manufacturer. For example, the OEM may be handling a number of different batches of devices which may require different software to be installed, and this may lead to a much greater overhead in controlling the installation of individual pieces of software in the secure region of each device and any verification/authentication steps to ensure that the installed software is trusted. It would also require any software developers to work directly with the microchip manufacturer for coordinating the software that is to be installed on a particular batch of devices, which may be undesirable.

Another approach can be to provide a dedicated serial port or some other communication channel via which software can be provided into the secure regions of the devices non-volatile memory, after it has left the OEM. However, this may require special tools or may require the device to include additional pins solely for injection of secure software, which may add to the cost of manufacturing the integrated circuit.

Another alternative could be that code could be installed into a non-secure area of the non-volatile memory after it has left the original equipment manufacturer, and then special software tools to copy that data into the secure area of memory. However, it may be required to ensure that those special software tools are not able to tamper with other secure code already installed within the memory. Hence, this approach would mean that different software installation tools would be required when installing secure software compared to non-secure software, which can increase the cost of developing devices which are intended to run secure software to be booted from a secure region of the non-volatile memory.

In the techniques discussed below, a method is provided for simplifying the installation of target software which is to be booted from a more secure region of the non-volatile memory. This can enable non-secure software installation tools to be used for installing the target software, while still maintaining security. This can be useful for reducing the development costs of the device, both for the original equipment manufacturer (who no longer needs to take responsibility for all secure software being installed onto a device) and for downstream parties needing to supply the secure software who do not need to use special installation tools dedicated to installation of secure software. This can be particularly important for devices to be used in the Internet of things, which are relatively power-constrained and circuit area-constrained and for which the cost budget per device may be so low that it is unlikely that a manufacturer or software developer would be willing to expend significant resources in developing dedicated tools for handling secure software installation separate from existing non-secure tools.

In the method described below, target software, which eventually needs to be installed in a more secure region of the non-volatile memory, is initially installed into a target region which is defined by the region defining data as a less secure region. The target software to be installed may include not only program code to be executed according to the target software, but also associated data to be used by the target software.

Hence, as the target software is initially installed into a less secure region, standard non-secure installation tools or software can be used. The target software is verified, and at least when verification of the target software is successful, and after installation of the target software into the less secure region, the region defining data of the device's access control circuitry is updated to change the target region from a less secure region to a more secure region. Hence, by changing the security status of the target region after the software has already been installed in the target region, this enables software to be placed in secure memory without needing special tools. Hence, this approach can eliminate the requirement to provide extra dedicated secure-installation tooling to handle software installation for secure devices.

The verification of the target software may be performed under control of installer software. In one example the installer software may itself be installed in a secure region of the non-volatile memory. This provides security as less secure code is not able to tamper with the installer software located in the more secure memory region.

Alternatively, the installer software could be stored in a less secure region of the non-volatile memory, but may be verified based on installer software verification information which is stored in the more secure region of the non-volatile memory. Hence, with this approach it can be safe to install the installer software into a less secure region of memory (e.g. using non-secure software installation tools) but some verification information may be embedded into a more secure region of the non-volatile memory (e.g. embedded at the point of manufacture) which can be used to check whether that installer software is appropriate and can be trusted to verify the target software to be installed. This approach can be useful to reduce the amount of secure storage which needs to be provided, and can help make more efficient use of non-volatile memory capacity as a whole as the installer software may be able to be downloaded on demand and installed by standard non-secure installation tools into a non-secure region of memory, and then overwritten when the installation of the target software is complete if the storage capacity in the non-secure region is needed for other purposes.

In one example, when the installer software is stored in a less secure region of the non-volatile memory, the installer software may be verified by bootloader software installed in a more secure region of the non-volatile memory, based on a hash value stored in a more secure region of the non-volatile memory. Whether the region defining data is allowed to be updated to change the definition of which regions are less secure or more secure may depend on the software requesting that update being verified by the bootloader software based on a hash value stored in the more secure region. This can ensure that only certain secure installation code which meets a known hash can request the change in the boundaries between the less and the more secure regions.

Although in some embodiments the bootloader software may allow two or more alternative forms of installer software corresponding to different hash values to be directly verified by bootloader software and/or trigger the updating of the region defining data, it can be more secure if the bootloader software only allows one particular form of installer software to be verified and/or update the region defining data. Hence in some examples, the installer software may be the only software for which a hash value is stored in the more secure region to enable direct verification by the bootloader software (with any other software to be installed being verified by the installer software, if the installer software itself is directly verified by the bootloader software). Also, in some examples the installer software which is verified based on the hash value by the bootloader software may be the only software which is allowed to trigger the updating of the region defining data, once the device has passed beyond a certain stage of its manufacture.

The region defining data could define the less secure and more secure regions in different ways. In some examples the memory address space of the non-volatile memory may be partitioned into two, with the addresses on one side of a boundary being considered more secure and the addresses on the other side of the boundary being considered less secure. In this case the updating of the region defining data could simply be updating of the boundary address which marks the partition between the more secure and less secure regions.

In other examples the memory address space of the non-volatile memory could be divided into a number of separate (potentially discontiguous) less secure and/or secure regions, with each region defined by an arbitrary start and end address (or start address and region size) as defined by the region defining data. In this case the updating of the region defining data may include changing the parameters defining the boundary addresses and/or size of certain regions, or changing a security attribute for a region which controls whether that address region is more or less secure.

In some implementations, the access control circuitry may support only two different types of security level for regions of the non-volatile memory. In this case the more secure region may be a secure region and the less secure region may be a non-secure region, with more access restrictions applied to the secure region than the non-secure region.

However in other examples three or more levels of security may be defined for particular regions of the non-volatile memory, with increasing and decreasing access rights. In this case the more and less secure regions described above can simply be any two regions with different levels of security applied to them.

The target software may be verified using asymmetric cryptography, for example elliptic curve cryptography or the like. This can provide greater security.

The verification may include verifying whether a cryptographic signature associated with the target software meets certain requirements. For example the signature may cover a hash value derived as a function of the target software, and could also cover other parameters such a size parameter discussed below. The cryptographic signature could be verified based on a public key associated with a particular party who is attesting to the authenticity of the target software. For example, the installer software may check whether the identity of the person signing matches a known identity of one or more trusted parties permitted to vouch for the authenticity of installed software. For example, the cryptographic signature may be derived from a bundle of information (including the hash, size parameter or any other information) associated with the target software using a private key associated with the signer, and the verification of the signature may be based on the public key of the signer, e.g. checking whether the result of a signature verification function applied to the signature based on the public key matches the parameters covered by the signature (such as the hash and size). Hence, the installer software can check the identity of the party attesting to the authenticity of the software before enabling the software installation to proceed.

As mentioned above, a size parameter may be provided along with the target software which may be indicative of a size of the target software. For example the size could be specified in a number of bytes or in some other unit. The size parameter can then be used by the installer software to determine the extent to which the region defining data needs to be updated to change the target region from a less secure region to a more secure region. Hence the region defining data may be updated based on the size parameter. As mentioned above, the size parameter may be verified based on the cryptographic signature associated with the target software, to police against a malicious party requesting installation of a software and then requesting that the size parameter is actually much greater than the size of the target software being installed, which could otherwise lead to additional information in less secure regions of the non-volatile memory becoming more secure which could lead to security vulnerabilities. Hence, by attesting to the authenticity of the size parameter based on the signature this can increase the trust that the device has been configured correctly during the installation of the target software to be booted from the newly created more secure region of the non-volatile memory.

The verification of the target software could be performed either before updating the region defining data, or after updating the region defining data, or both before and after updating the region defining data.

Hence in some examples the verification may be performed first, and if the verification is unsuccessful then the region defining data is not updated and so the target region would remain designated as a less secure region of the address space of the non-volatile memory.

However, in other examples the region defining data could be updated to change the target region from a less secure region to a more secure region, regardless of whether the verification of the target software is successful. The target software could then be verified after updating the region defining data, and if the verification at this point is deemed to be unsuccessful then the method may include changing the target region back from a more secure region to a less secure region and preventing execution of software from the target region. The prevention of execution of software from the target region could be achieved in different ways, for example by erasing the data and code from the target region, or by setting a control flag which prevents booting or execution from the target region.

In other examples the target software could be verified both before and after updating the region defining data. It may be useful to provide a two-step verification process, so that an initial verification step is performed before any update to the region defining data is allowed, to avoid any change to the region defining data in cases where the target software cannot be verified, but then a second verification step may be performed after updating the region defining data to check that nothing has been modified during the process for importing the target software which could otherwise affect security.

Hence, it will be appreciated that verification of the target software before updating the region defining data is not essential as it could also be done after. Similarly, verification after updating the region defining data is also not essential if it is done before. Nevertheless both are possible either individually or in combination.

In one example the target software may be associated with a verification indicator set to a first value when the target software is installed in the less secure region. When verification of the target software is successful and the region defining data has been updated to define the target region as a more secure region, the verification indicator may be updated to a second value (for example, under control of the installer software or the bootloader software). Execution of the target software may be disabled when the verification indicator has the first value. For example, disabling of execution of the target software could be achieved either by disabling booting of the target software at all (e.g. disabling copying of the target software from the non-volatile memory to a random access memory (RAM) from which processing circuitry can execute the software) or by allowing booting of the software from the non-volatile memory to a region of the RAM but then disabling execution from that region of RAM. Hence, in general by providing a flag which can be used to control whether the software can be executed, and preventing the flag being set to the second value until both (i) the verification has been successful and (ii) the region defining data has been updated to define the target region as the more secure region, then this prevents inappropriate execution of potentially sensitive software in cases where either the software has not yet been verified as authentic or the appropriate security protections for the target region containing the software have not yet been set up by updating the region defining data.

In one example, access to the at least one less secure region may be disabled during at least one of: a verification process for verifying the target software; and a region update process for updating the region defining data to change the target region from a less secure region to a more secure region. This prevents other less secure code executing on the device from being able to access the installed target software until the software installation is finished (by which point the region defining data will have updated the region defining data to mark the target region as more secure). Also, debug accesses to the non-volatile memory may be disabled during one or both of the verification process and the region update process. This prevents non-secure accesses to the non-volatile memory from gaining inappropriate access to the potentially sensitive code and data of the target software while the installation process is ongoing.

The non-volatile memory could be implemented using a range of memory technologies, for example magnetoresistive RAM, ferroelectric RAM, or a read only memory. However in one example, the non-volatile memory may be flash memory.

FIG. 1 schematically illustrates an example of an information processing device 2. The device 2 includes processing circuitry 4 (e.g. a processor core, or cluster of cores) for performing data processing, and memory access control circuitry 6 for controlling access to regions of a memory address space accessible to the processing circuitry 4. The address space may be mapped onto a number of memory devices including a random access memory 8 (RAM, implemented using a volatile memory technology such as DRAM for example) and a non-volatile memory 10 (e.g. flash memory or other types of non-volatile memory as discussed above). Persistent data and software code, which is to be retained even when the device is not powered, may be stored in the non-volatile memory 10. When the device is powered up, bootloader code may control booting (copying) into RAM 8 of software and data to be processed by the processing circuitry 4, and execution of the software may then be with reference to the copy of the software stored in the RAM. Although FIG. 1 shows a single shared memory access controller 6 controlling access to both the RAM 8 and the non-volatile memory 10, in other examples separate access control units could be provided for both types of memory.

The memory access controller 6 may define region defining data 7 which defines regions of the RAM 8 and non-volatile memory 10 as either secure regions or less secure regions. Memory accesses (reads or writes) to those regions designated as more secure may have greater access restrictions imposed on them than accesses to less secure regions. For example, the processing circuitry 4 may only be allowed to access certain more secure regions of the memories 8, 10 when operating in a secure operating state. Transitions between secure and less secure operating states of the processing circuitry 4 may be carefully controlled. For example the processing circuitry 4 may have a hardware architecture which polices the secure/less secure boundaries, for example based on the TrustZone® architecture provided by Arm® Limited of Cambridge, UK. The region defining data which identifies regions of memory are secure or less secure could be defined in different ways, e.g. using entries each corresponding to a region of variable size which specifies start and end addresses of the region (either using two separate boundary addresses, or with a single boundary address and a size parameter) and an attribute indicating whether the region is less secure or more secure. Alternatively, in other implementations the region defining data 7 could simply comprise one or more boundary addresses, with the boundary addresses marking the points at which the security status changes (e.g. in a system only having two security states, a single boundary address could mark the division between secure/non-secure memory; or in a system having three or more security states there could be two or more boundary addresses).

The device 2 may also include other elements which may communicate with the processing circuitry 4 over a bus network 12. For example these elements may include a display 14 for displaying information to a user, a user input unit 16 for accepting user input (e.g. buttons, a keyboard, a touchscreen or other forms of user interface), a communication interface 18 for performing wired or wireless communication with external devices, such as by communication protocols such as WiFi®, Bluetooth®, etc., and one or more sensors 20 for sensing parameters associated with the device or its surrounding such as a temperature sensor, pressure sensor, light sensor etc. It will be appreciated that the particular set of circuit elements provided in the device may depend on the particular purpose for which the device is intended. Not all implementations of the device 2 need to have all of the elements 14, 16, 18, 20 shown in FIG. 1. For example, in some relatively simple Internet of things type devices, there may not be any need to interact with local users at the physical location of the device, so it may not be necessary to provide the display 14 and/or the user input module 16. Instead, such a device could function as a sensor which records data using its sensors 20, processes the sensed data and then communicates these results to an external device via the communication interface 18. Other devices may need to interact with the user and so may require the display 14 or user input interface 16, but may not necessarily require sensors 20. Hence, the particular configuration of the device may vary significantly, and could include other elements not shown in FIG. 1.

Figure 2:
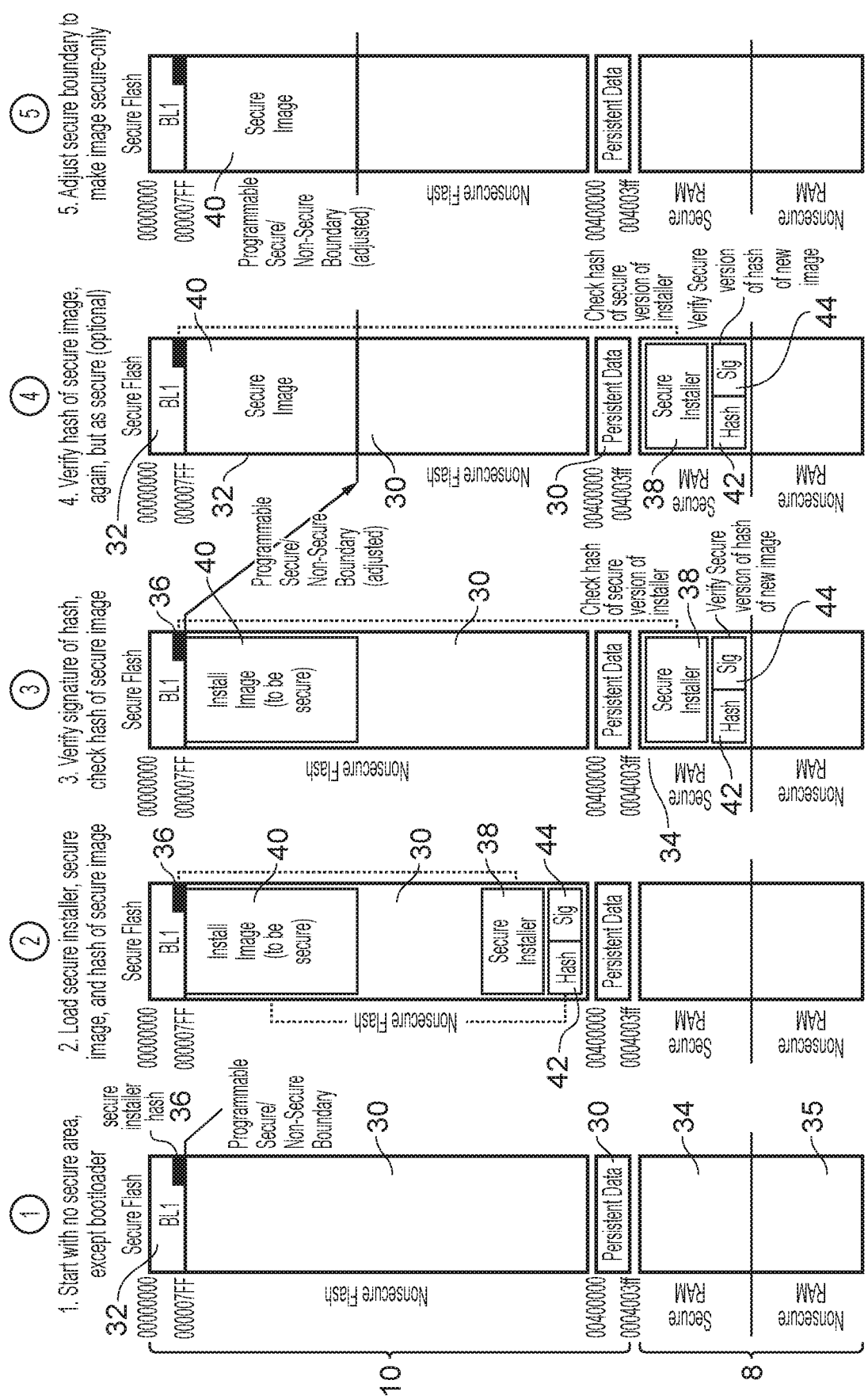
FIG. 2 shows a schematic of a method for installing software which is to be booted from a secure region of the non-volatile memory.

FIG. 2 schematically illustrates a method for installing target software into the non-volatile memory 10 of the device 2. As shown in part 1 of FIG. 2, the non-volatile memory 10 may be divided into one or more non-secure regions 30 and one or more secure regions 32 as defined by the region defining data of the memory access control unit 6. Similarly the RAM 8 may also be divided into secure regions 34 and non-secure regions 35. For conciseness in FIG. 2 the diagram simply shows a single boundary between secure and non-secure regions in both RAM 8 and non-volatile memory 10, but it will be appreciated that it is also possible to define multiple discontiguous regions of a given security level within either the RAM 8 or the non-volatile memory 10.

Typically, the device will need to have its software installed into the secure region of the non-volatile memory at some point during its lifecycle, for example at manufacture or in a post processing step. However there can be challenge in handling installation of secure code which is to reside within a secure region 32 of the non-volatile memory at the point when it is booted (copied into the RAM 8 for execution by the processing circuitry 4). Typically, OEMs may install software through JTAG or some other means at a point in production when they have full access to the device's memory map. However, in order to have a root of trust on the device, it may not be allowable for anyone past the initial manufacturer to have full memory access to production devices. This means that if software is to be installed in secure region 32 post-manufacture, it may be needed to create and use special tools to install software, which require procedures that differ from working with non-secure devices.

This problem can be avoided using the method shown in FIG. 2, which enables existing production non-secure flashing tools to install secure software directly to non-secure memory and then changes the security status of that region of memory once verification is complete, to eliminate any need in a production environment for extra tooling for flashing secure devices. This can reduce the cost of development of data processing devices which can be particularly useful in the Internet of things domain where the low cost per device may be such that the overhead of developing special tools for secure software installation may not be considered justified.

FIG. 2 shows one example of a method as follows. As shown in part 1, initially the device 2 is created with the memory space in the non-volatile memory 10 relatively blank, except for bootloader code BL1 installed in a secure region 32 and any persistent data (which may be in a less secure region 30 in this example). The installation of the bootloader code and the persistent data may have been carried out by the OEM in the factory. The bootloader code BL1 may include a hash value 36 which corresponds to a value derived as a function of the code/data of a secure installer 38 which is trusted to manage the installation of further secure software. The secure installer hash value 36 is stored (by the OEM at the manufacturing stage) within a secure region 32 of the non-volatile memory, as part of the bootloader code BL1.

After the device has left the OEM, when it is subsequently desired to install a particular piece of target software into secure memory, then as shown at step 2 of FIG. 2, standard off-the-shelf non-secure flashing tools can be used to write the image 40 of the target software into a less secure region 30 of the non-volatile memory 10. The addresses at which the target image 40 are installed may be the same addresses which eventually become the secure region intended to contain the target software. However, at the point when the target image is written to the non-volatile memory 10 these addresses are defined in the region defining data 7 of the memory access controller 6 as less secure regions.

Also, a secure installer 38 is installed into a less secure region 30 of the non-volatile memory 10. Again, standard off-the-shelf non-secure flashing tools can be used for this. The secure installer can be written to any address other than the region to contain the target image 40, but it can be useful to place the temporary installer in a region where non-secure software will eventually be placed, as this allows reuse of that area after the installation of the target software 40 is finished. The secure installer 38 is expected to be the software which matches the secure installer hash 36 which is maintained by the bootloader BL1.

Also, the non-secure flashing tool also writes, to a non-secure region 30 of the non-volatile memory 10, a signed hash of the target software image 40 to be installed. That is, the non-volatile memory is written with a hash value 42 which defines the expected result of applying a certain hash function to the contents of the target image 40. The hash value 42 and any other parameters associated with the target software (such as a size parameter defining the size of the target software) are signed by a trusted party that is attesting to the authenticity of the software, to generate a signature 44 (this signing will have taken place offline at the point when the bundle of information to be provided for installing the image 40 was generated). The signature 44 is provided to the device along with the software image 40, and can be used to check the authenticity of the hash 42 and any other parameters such as the size. These can be used during verification of the target software image 40 as described below.

As shown in part 3, when the device is booted, the device (under control of bootloader BL1) detects the new images in non-secure memory and imports the secure installer 38 into a secure region 34 of RAM 8. Also the signed hash 42, 44 is imported into the secure RAM. The bootloader code may also be imported into RAM and the bootloader derives a hash as a function of the code and data associated with a secure installer 38, and checks whether the derived hash matches the secure installer hash 36 which is stored in the secure region of non-volatile memory. If there is a mismatch between the expected hash 36 and the actual derived hash of the secure installer, then the process may be terminated to prevent installation of the target image.

If the secure installer 38 is successfully verified then the secure installer is allowed to execute, and the secure installer then verifies the target software 40 to be installed using the target software hash 42 and signature 44. For example the secure installer 38 calculates a hash value as a function of the target image 40 which is in the non-secure region 30 of the non-volatile memory, and compares the calculated hash with the expected hash 42 to detect whether they match. If there is a mismatch then again the process can be terminated. Also, the secure installer 38 checks whether the signature 44 can be verified based on some information associated with the party that is trusted to attest to the authenticity of the software. For example the secure installer 38 may obtain one or more public keys associated with one or more trusted entities, and check whether the signature 44 that has been provided with the target software 40 can be authenticated based on any of those public keys. For example the signature 44 may correspond to the result of encrypting one or more values (such as the hash and size parameter) with a private key of the trusted entity, and the secure installer 38 may check whether decrypting the signature 44 with the public key of a trusted entity matches the hash value 42 and size parameter provided for the secure software. Hence, the verification may include both verification of the contents of the software 40 to be installed and associated parameters such as its size parameter, and also verification of the identity of the party providing the software.

As shown in steps 3 and 4 of FIG. 2, if the verification is successful for both the secure installer 38 and the target software 40, then the secure/non-secure boundary is adjusted so that the target region containing the target software 40 now becomes a more secure region 32 of non-volatile memory. For example, one or more boundary addresses or security attributes in the region defining data 7 may be updated to change the security status of the addresses in the target region of memory in which the target software 40 was installed. A size parameter may indicate the size of the region to be designated as secure, and the change in the region defining data 7 may be controlled based on the size parameter (e.g. the boundary between secure/non-secure regions may be moved by an amount corresponding to the size parameter). Hence, now the secure image associated with the target software 40 is resident within a secure region of the non-volatile memory.

As shown in part 4 of FIG. 2, optionally it is possible to then load and run the secure installer 38 again to repeat the verification of the secure image 40, but now with the new secure boundary in place, before deciding whether to accept the new image or reject it by erasing it or otherwise preventing subsequent execution of the target software 40. This post-update verification may be optional, and in other examples the only verification performed may be before updating the region defining data. Alternatively, other approaches could omit the pre-boundary adjustment verification and only perform adjustment after the boundary has already been adjusted. Nevertheless, either way by performing verification of the hash of the secure image this can check that only the expected software is allowed to be installed into secure memory (and/or that only software provided by certain trusted parties can be installed into secure memory).

As shown in part 5 of FIG. 2, the device can then be booted with the new secure/non-secure layout and the newly imported secure image 40 in place, to enable execution of software corresponding to the secure image 40.

Figure 3:
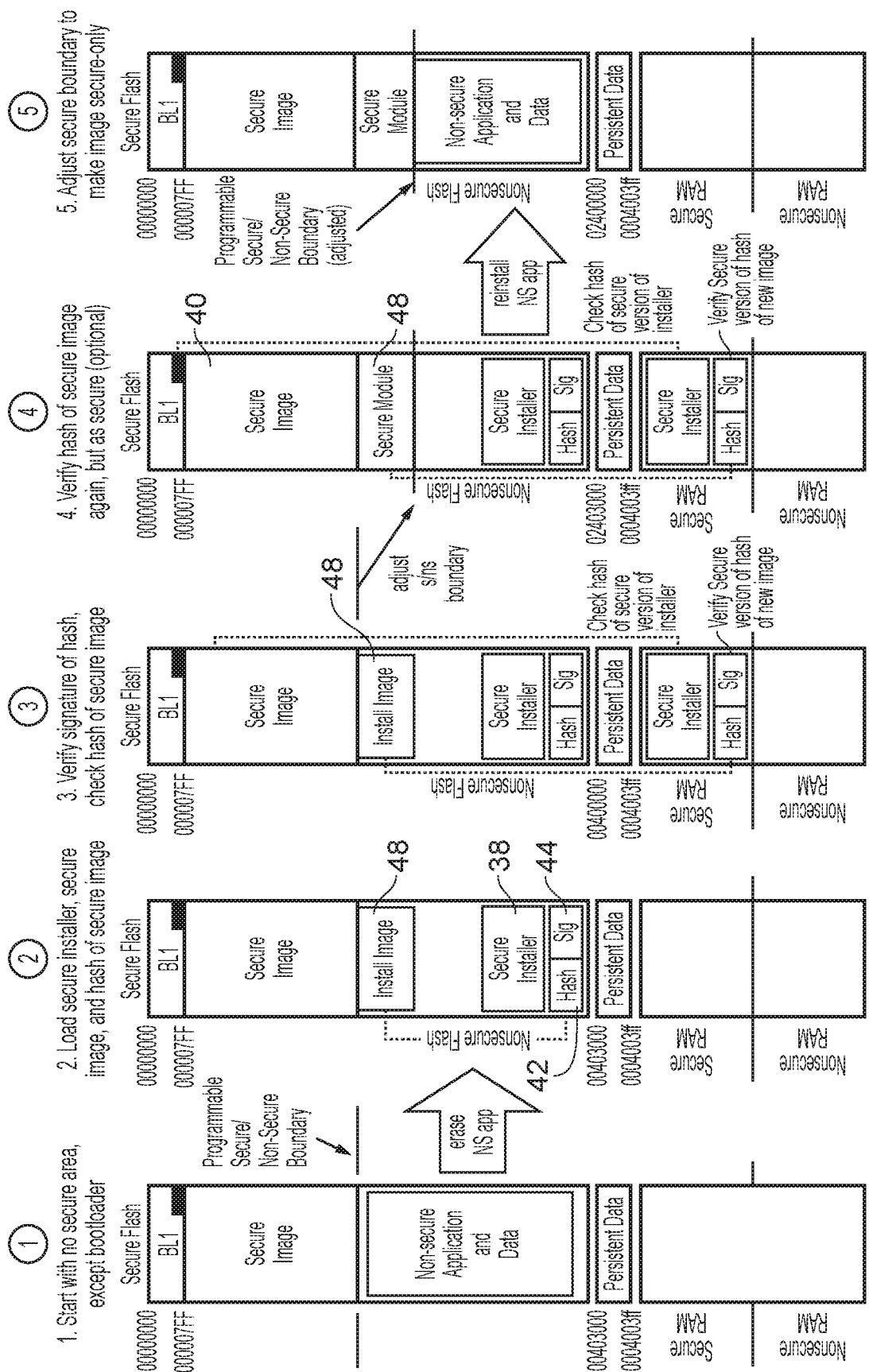
FIG. 3 shows a further instance of performing the method to install a further secure module.

As shown in FIG. 3, the same method can then be performed again later on to install further secure module 48, after already having installed the previous secure image 40. Again this may proceed in a similar way to that discussed in FIG. 2. In FIG. 3, if some non-secure application or data has already been provided in the non-volatile memory in the locations which are to be occupied by the secure installer 38, hash 42 or signature 44, then this data can temporarily be erased prior to step 2 and then reinstalled (e.g. by downloading this information again or restoring the data from backup storage) at step 5 once the installation is complete.

In some examples the secure software 40 may be associated with an enable flag which serves as an indicator of whether that software can be executed. For example this flag may be initially written in a first state (either 0 or 1) at the point when the secure image 40 is written to the non-volatile memory, and the verification of the hash 42 may be dependent on this indicator being in the first state. At the point when the region defining data has been updated to adjust the boundary between the secure and non-secure regions and also any verification required has completed, then the verification indicator associated with the target software can then be flipped to indicate a second state (e.g. the opposite of 0 and 1). The secure bootloader code BL1, which may initially be loaded on booting of a device and may control subsequent booting of other code, may be arranged so that it prevents any software from secure regions of non-volatile memory being booted and copied into RAM 8 if the corresponding enable flag is still in the first state. Hence, the system may refuse to boot an image installed in secure region of RAM if that software has not yet been verified or the software is still in less secure memory as the installation process has not yet finished.

Hence, with the approach discussed above, a master bootloader (e.g. bootloader BL1) provides enforcement of security by maintaining control of the CPU until additional software is loaded, allowing only the addition of specific software (the secure installer 38 corresponding to the hash 36) until this point. The secure installer 38 uses asymmetric cryptography to verify that the new software 40 comes from a trusted source, rejecting it if it does not. The bootloader BL1, secure installer 38 or another operating system component uses built-in hardware on the device (e.g. the access control unit 6) to adjust the boundary of the secure area of memory, under secure control during only the boot process. The bootloader or an operating system component prohibits any non-secure or debug accesses during the verification process and during modification of the secure area parameters. Optionally, a two-step verification process can be performed, in which the verification is performed both before and after the modification to the secure area is performed, may be used to ensure that the image was not modified during the import process.

Figure 4:
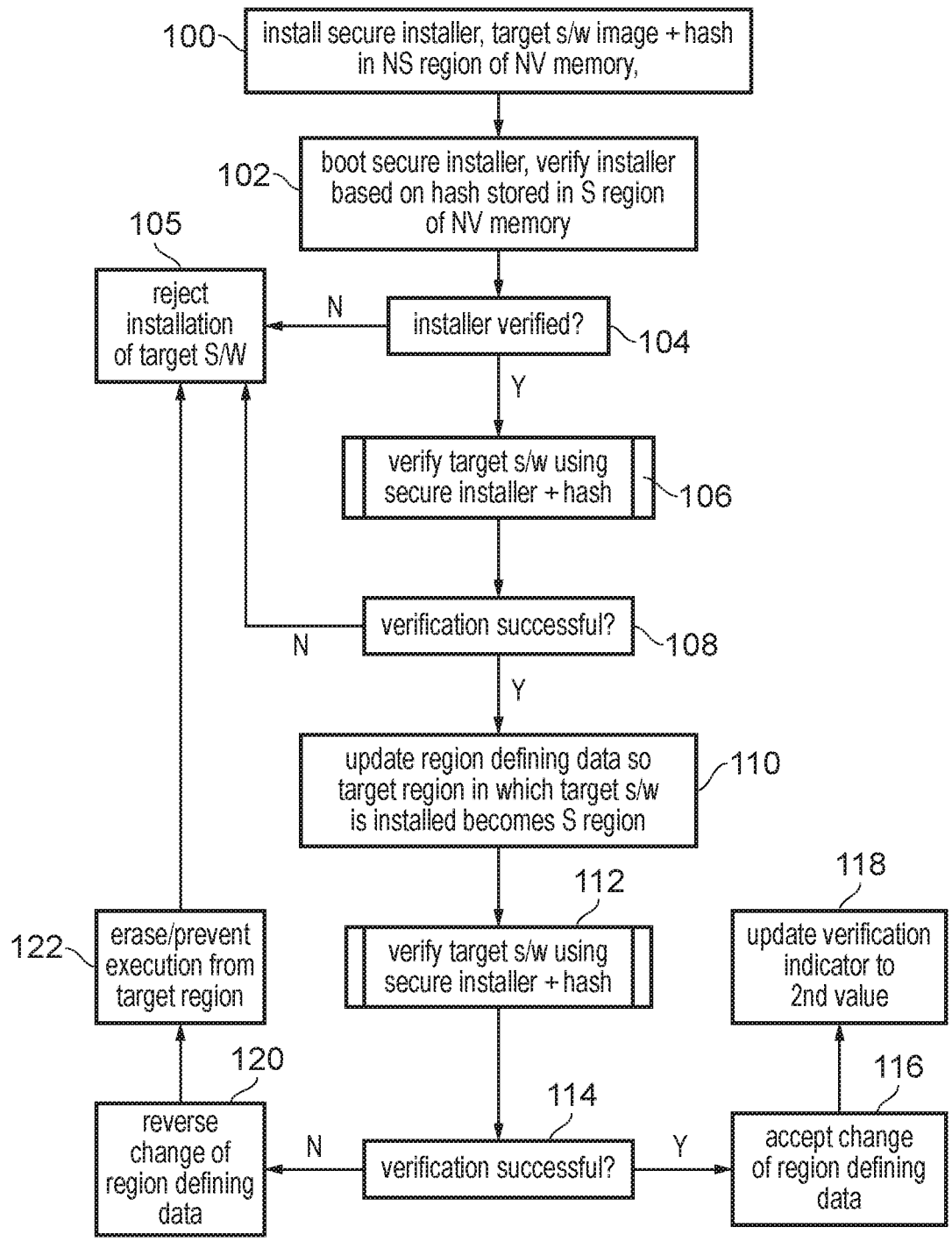
FIG. 4 is a flow diagram illustrating a method of software installation.

FIG. 4 shows a flow diagram illustrating a method for controlling installation of software. At step 100, non-secure flashing tools (which may be the same as tools used to install non-secure software into non-secure regions of non-volatile memory 10) install the secure installer 38, the target software image 40 and the hash 42 (signed by the signature 44) in a non-secure region of the non-volatile memory 10. At step 102, the secure installer 38 is booted into the RAM 8 and the installer 28 is verified by the bootloader BL1 based on the hash value 36 stored in the secure region 32 of the non-volatile memory 10. That is, the bootloader may compare a function derived from the code and data of the secure installer 38 with the stored secure hash value 36, and determine that verification is unsuccessful if these values do not match. At step 104 the bootloader determines whether the installer 38 has successfully been verified and if not then at step 105 the installation of the target software is rejected, for example by preventing execution of this secure installer 38.

If the installer is successfully verified then at step 106 the installer is executed and the installer 38 verifies whether the target software 40 can be accepted for installation. This verification is based on the hash value 42 and signature 44 and will be described in more detail with respect to FIG. 5. At step 108 the secure installer 38 determines whether verification is successful and if not then again installation of the target software is rejected at step 105 (e.g. by erasing the region in which the target software was installed, or by preventing execution of code booted from that region).

If verification of the target software 40 is successful then at step 110 the region defining data 7 is updated so that the target region into which the target software 40 was installed now becomes a more secure region of the non-volatile memory 10. At step 112 a second verification step may be performed similar to step 106, again as discussed with respect to FIG. 5 below. At step 114 the secure installer 38 again determines whether verification was successful. If verification was successful then at step 116 the change in the region defining data from step 110 can be accepted and at step 118 a verification indicator associated with the target software may be switched from a first value to a second value. Execution of code from the target software may be restricted to cases when the verification indicator has the second value. The verification indicator may initially be set to the first value at the point when the software is installed at step 100, and the verification at steps 106 and 112 may be unsuccessful if the party attempts to install code where the verification indicator already has the second value (because at this case the installed code would not match the expected hash 42, or if an attacker has tampered with the hash 42, because in this case the signature of the hash 42 would not be verified based on the trusted party's public key).

If at step 114 it was determined that the post-update verification was unsuccessful then at step 120 the change of region defining data performed at step 110 is reversed, and at step 122 the data from the target region is either erased or otherwise the execution of code from that target region is prevented (e.g. because the verification indicator has not been changed from the first value), and then again at step 105 the installation of a target software is rejected.

FIG. 4 shows an example where there are two verification steps, one at step 106 and another at step 112. In other examples there may be no second step of verifying the target software after the region defining data has been updated and this case the method may proceed direct from step 110 to step 116, omitting steps 112, 114, 120, 122. Alternatively, step 106 and step 108 could be omitted and in this case the only verification may be performed at step 112, and in this case the method may proceed direct from step 104 to step 110.

Figure 5:
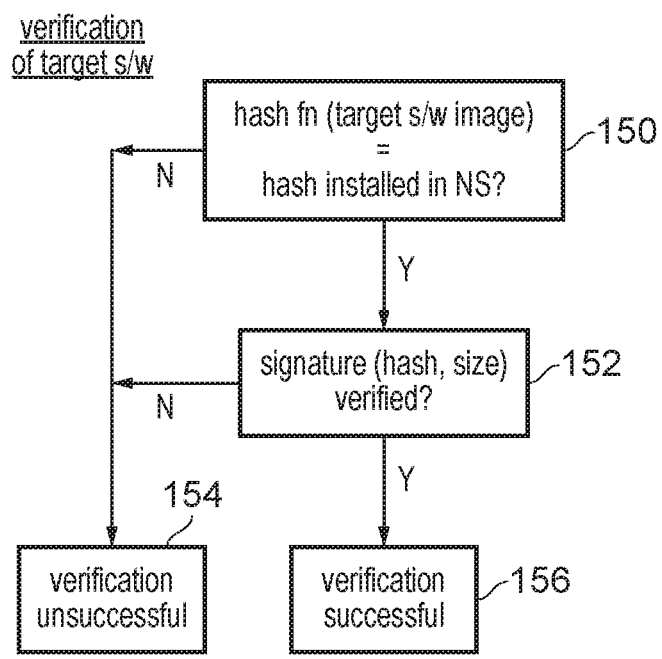
FIG. 5 is a flow diagram showing in more detail steps for verifying target software.

FIG. 5 is a flow diagram showing the verification at step 106 or 112. At step 150 the secure installer checks whether a value derived as a function of the target software image 40 matches the hash value 42 which was installed in the non-secure part of the non-volatile memory along with the target image 40. Also at step 152 the secure installer checks whether the signature 44 associated with the target software, which may cover the hash 42 and the size parameter, (and optionally other parameters) can be verified based on information defining the trusted entity who is allowed to attest to the authenticity of the hash.

If either steps 150 or 152 determine that the hash or the signature does not meet the expected requirements then at step 154 it is determined that verification is unsuccessful. If the hashes match and the signature can be successfully verified then at step 156 the verification is successful. Hence these checks enable the installer to check that the changes to the secure/non-secure boundary as represented by the size parameter are as expected by the party signing the hash and if this can be checked as well as the identity of the party signing (e.g. based on public key information from an asymmetric cryptography scheme) and the hashes match then the verification is successful and the installation can be allowed to proceed. The size parameter covered by the signature may be what controls the region defining data to be updated at step 110.

The use of a hash 42 for the verification of the target software is not essential. In other examples, the signature 44 could be derived from the target software image 40 directly, rather than a hash of the image, and the verification of the target software could simply comprise verifying whether the signature is authentic based on the public key of the signer.

In this case, step 150 of FIG. 5 could be omitted and in step 152 the signature may be based on the target image as a whole, not the hash. However, use of a hash for checking the signature may make the signature verification more efficient as it means less data needs to be compared with the signature at the time of performing the verification.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. A software installation method for a device comprising non-volatile memory and access control circuitry to control access to the non-volatile memory based on region defining data defining whether a given region of the non-volatile memory is a less secure region or a more secure region, where the access control circuitry is configured to apply greater restriction on access to a more secure region than to a less secure region;

the method comprising:
  installing target software in a target region of the non-volatile memory defined by the region defining data as a less secure region;
    verifying the target software including determining whether a match exists between a value associated with the target software and a predetermined trusted value; and
  at least when verification of the target software results in a determination that the match exists, and after installation of the target software, updating the region defining data to change the target region from a less secure region to a more secure region,
  wherein the target software is associated with a verification indicator set to a first value when the target software is installed in the less secure region,
the method further comprising:
  when verification of the target software results in a determination that the match exists and the region defining data is updated to define the target region as a more secure region, updating the verification indicator to a second value; and disabling execution of the target software when the verification indicator has the first value.

2. The method of claim 1, in which the target software is verified under control of installer software, where at least one of the installer software and installer software verification information for verifying the installer software is stored in a more secure region of the non-volatile memory.

3. The method of claim 2, in which the installer software is installed in a less secure region of the non-volatile memory, and
  the updating of the region defining data is conditional on the installer software being verified, by bootloader software installed in a more secure region, based on a hash value stored in a more secure region.

4. The method of claim 3, in which at least one of:
  the installer software is the only software for which a hash value is stored in the more secure region to enable direct verification by the bootloader software; and
  the installer software which is verified based on said hash value by the bootloader software is the only software which is allowed to trigger the updating of the region defining data associated with the target region in which the target software is installed.

5. The method of claim 1, in which the target software is verified using asymmetric cryptography.

6. The method of claim 1, in which verifying the target software comprises verifying a cryptographic signature associated with the target software.

7. The method of claim 1, in which when verification of the target software results in a determination that the match exists, the region defining data is updated based on a size parameter indicative of a size of the target software.

8. The method of claim 7, in which the size parameter is verified based on a cryptographic signature associated with the target software.

9. The method of claim 1, in which the target software is verified both before and after updating the region defining data.

10. The method of claim 1, in which when the verification of the target software is determined to be unsuccessful after updating the region defining data when there is a determination that the match does not exist, the method comprises:
  changing the target region from a more secure region to a less secure region; and
  preventing execution of software from the target region.

11. The method of claim 1, in which access to the at least one less secure region is disabled during at least one of:
  a verification process for verifying the target software; and
  a region update process for updating the region defining data to change the target region from a less secure region to a more secure region.

12. The method of claim 1, in which debug access to the non-volatile memory is disabled during at least one of:
  a verification process for verifying the target software; and
  a region update process for updating the region defining data to change the target region from a less secure region to a more secure region.

13. The method of claim 1, in which the non-volatile memory comprises flash memory.

14. At least one non-transitory, computer-readable storage medium to store at least one computer program to control a computer device to perform the method of claim 1.

15. An apparatus comprising:
  processing circuitry to perform data processing; and
  data storage storing at least one computer program for controlling the processing circuitry to perform the method of claim 1.

* * * * *